July 5, 1960  G. HERZOG  2,944,149
RADIOACTIVITY EARTH EXPLORATION
Original Filed Aug. 9, 1951  2 Sheets-Sheet 1
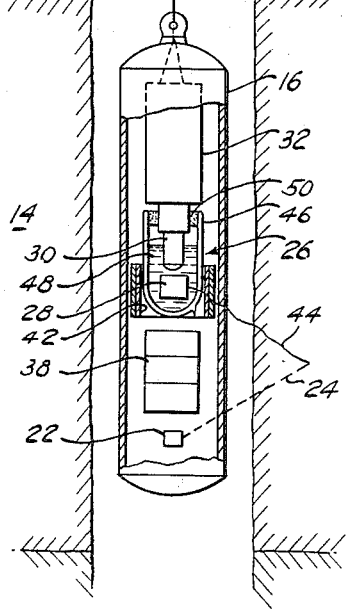
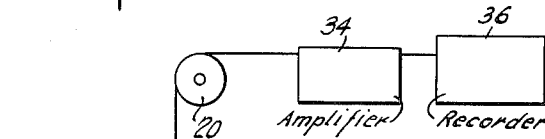
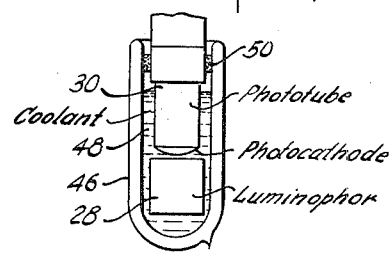
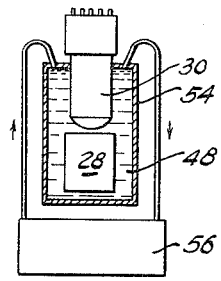

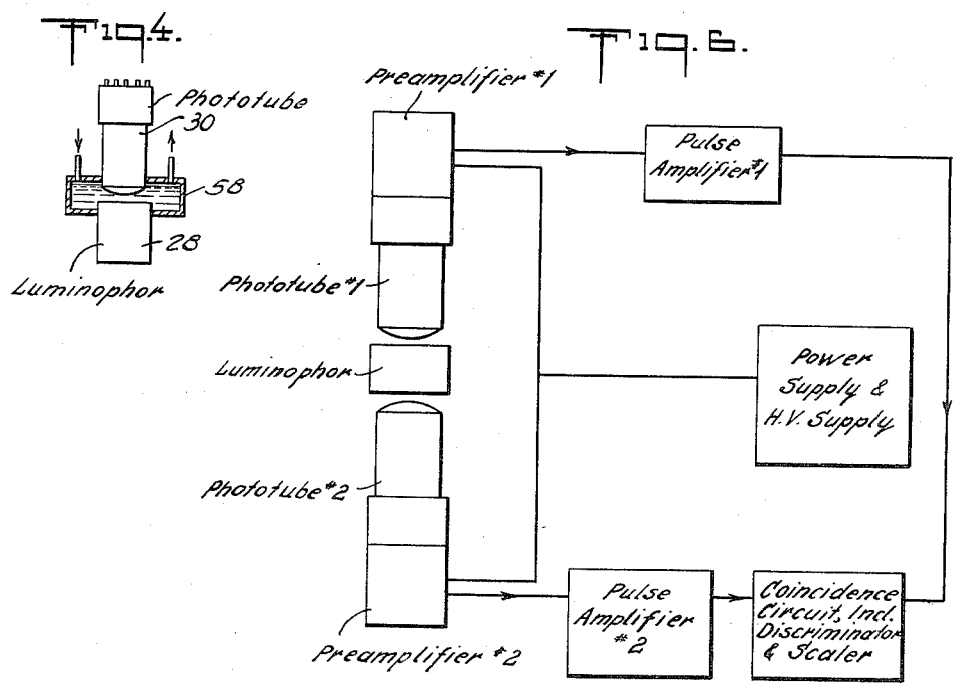
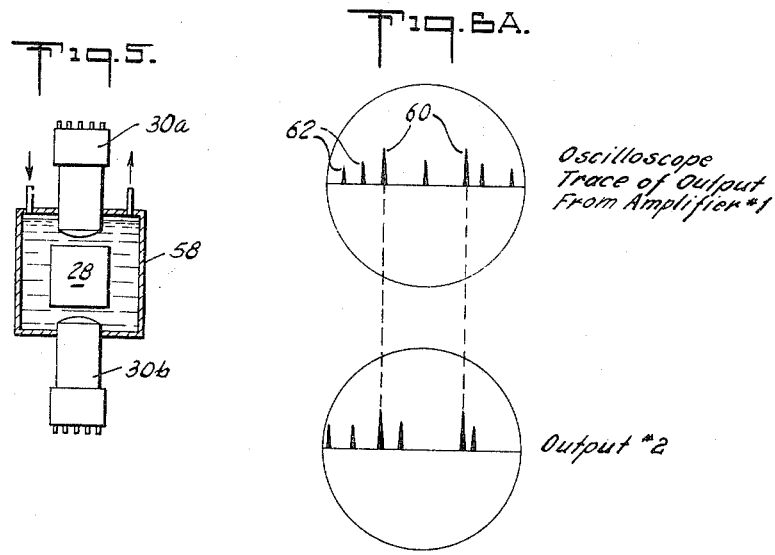

United States Patent Office 2,944,149
Patented July 5, 1960

2,944,149

RADIOACTIVITY EARTH EXPLORATION

Gerhard Herzog, Houston, Tex., assignor to Texaco Inc., a corporation of Delaware Original application Aug. 9, 1951, Ser. No. 240,992, now Patent No. 2,782,318, dated Feb. 19, 1957. Divided and this application Oct. 9, 1956, Ser. No. 614,970

2 Claims. (Cl. 250—71)

This invention relates to radioactivity well-logging or earth exploration in which measurements are made of the intensities of penetrative radiation either emitted naturally in the earth formations, produced as secondary radiation by the bombardment of the formations with primary radiation, or that originating in a source and scattered in the earth formations and returned to a detecting device near the source.

This is a division of my co-pending application Serial No. 240,992, filed August 9, 1951 and issued February 19, 1957, as U.S. Letters Patent No. 2,782,318.

The principal object of the invention is the provision of a method and an apparatus by means of which the radiation such as that entering a bore hole is measured with very high efficiency within a zone having a vertical dimension which is relatively small as compared to present practice. Because of this feature of the invention, much better definition is obtained or, in other words, the positions or locations of the interfaces or boundaries between adjacent formations can be determined with far greater accuracy than has been heretofore obtainable.

It is believed that the several forms of radioactivity well-logging mentioned in the first paragraph above are well understood. It may be pointed out, however, that in "natural gamma ray" logging a radiation detector is passed through a bore hole and measurements are made of variations in the intensities of gamma rays naturally emitted in the materials of the formations as the detector passes through these formations. In "induced gamma ray" logging or as it is frequently termed "neutron-gamma ray" logging, a source of primary radiation such as neutrons is passed through the hole so that neutrons will bombard the formations wherein, depending upon the nature, porosity, etc. of the formations, gamma rays will be produced, some of these gamma rays entering the bore hole to strike a detector therein. A measurement of the intensities of these induced gamma rays is particularly useful in the determination of the porosities and hydrogen content of the formations. In another form of radioactivity well-logging a source of gamma rays is passed through the bore hole and gamma rays from the source penetrate and are scattered or diffused within the formations, some of the scattered gamma rays returning to strike a detector in the bore hole. This form of logging is usually termed "scattered gamma ray" well-logging and is useful in determining earth formation densities, for example.

In well-logging operations of the induced gamma ray and the scattered gamma ray types, the distance of the effective volume of the detector from the radiation source is critical. Thus, in both of these forms of well-logging there is a critical distance for the best detection of the radiation and if the detectory is closer to the source than this critical distance, the number of induced gamma rays will increase as the formation porosity (hydrogen content) increases, whereas beyond this critical distance the number of induced gamma rays recorded will decrease as the porosity increases. From a practical standpoint, it is generally necessary or at least advisable to operate in such a manner that the distance between the source and the detector is greater than the critical distance. Experiments have shown that in induced gamma ray logging the critical distance is approximately 8 inches although this will vary somewhat with the size and type of the source, the nature of the formations bombarded, etc. It has been found that where the detector is of the electrical pulse producing or counter type such as is disclosed in the U.S. Letters Patent to D. G. C. Hare, No. 2,397,071, granted March 19, 1946, a vertical detector length of 12 to 15 inches is satisfactory where induced gamma rays are being measured. The end of the detector closer to the source is subjected to a greater number of the induced gamma rays than the end farther from the source and the total length of the detector is limited by the fact that as the intensity of the induced gamma rays falls off, the difference between the number of detected induced gamma rays and the number of detected naturally emitted gamma rays decreases. Thus, if the detector were extremely long, say two or more feet, the end of the detector farther from the source might be out of range of the induced gamma rays so as to be responsive only to natural gamma rays. Obviously the recording of these naturally emitted gamma rays along with the induced gamma rays would produce a record which would not be clearly indicative of the characteristics of the formations determinable by means of a good induced gamma ray log.

In conducting radioactivity well-logging, radiation detectors such as the ionization chamber, the conventional Geiger-Mueller counters and the counters of the type disclosed in the aforementioned Hare Patent No. 2,397,071 are most commonly used. These detectors are usually of the order of 2½ inches in diameter and where induced gamma rays or scattered gamma rays are being measured, the detector may be approximately 12 to 15 inches in length. In measuring gamma rays naturally emitted in the formations, the detector may be 30 to 40 inches or more in length. When detectors of these types are used, it is frequently impossible to obtain good definition or, in other words, to locate accurately the boundaries or interfaces between adjacent formations. Good definition is, of course, very important, particularly when the formations are thin and where it may be desired to gun-perforate a well casing opposite a particular formation or a portion thereof.

In accordance with this invention a detector is used which can be relatively short in its vertical dimension while at the same time it will detect or measure the same number of gamma rays as a much longer detector of the types heretofore used. The scintillation type detector or "Scintillometer" fulfills the above-mentioned requirements very well. For the same volume, the scintillation detector is from 6 to 12 times or more as efficient as a good gamma ray counter and, therefore, a scintillation detector in which the phosphor or luminophor is, say, 2½ inches in diameter and one inch in vertical height, is as efficient as an ionization chamber or Geiger-Mueller counter from 6 to 12 inches in length and the same diameter. As has been stated hereinabove, in induced gamma ray logging, the end of a conventional detector closer to the radiation source is subjected to a greater number of induced gamma rays than the end farther from the source. If then, a scintillation detector is placed at about the same vertical distance from the source as the near end of a conventional detector, it will be subjected to a comparatively large number of induced or scattered gamma rays and since such a detector is many times more efficient than the conventional detector, the resulting log or record will be as good or better than the records heretofore obtained while at the same time the definition of the formation boundaries will be much sharper and clearer than with the log made with a conventional detector. Again, because of the higher efficiency of the scintillation detector, a good well or bore hole log can be made at a higher speed than where conventional type detectors are used. Another advantage of a scintillation type detector in well-logging or exploration of the surface of the earth resides in the fact that very weak or low-energy gamma rays can be detected whereas these gamma rays might be too weak to produce ionization in a conventional detector. Still another advantage of the scintillation detector as compared to the conventional type is that, because of the small size of the former, there will be better differentiation between the induced gamma rays and the natural gamma rays, and this is of course important in an induced gamma ray log.

In scattered gamma ray logging the situation is similar to that which has been described with reference to induced gamma ray logging and it is desirable to utilize a detector having the least possible volume with an efficiency at least equivalent to that of a conventional elongated detector. In scattered gamma ray logging it is usually desirable to separate the source and the detector by a somewhat greater distance than in the case of induced gamma ray logging and it has been found that where the near end of a conventional detector is separated from the source by a distance of the order of 17 to 22 inches, good results are obtained. With the scintillation detector substituted for the conventional instrument much better definition can be obtained in this type of log and, again, because of the higher efficiency of the scintillation detector, the gamma ray source can be smaller without a material detrimental effect on the log.

In natural gamma ray logging the scintillation type of detector is also very desirable since the overall size and weight of the logging instrument can be very materially reduced. In order to be as efficient as a gamma ray counter having a length of 30 or 40 inches, the luminophor of the scintillation detector would have to be several inches in length. While at the present time crystals of this length are rare or at least difficult to obtain, much development work is being done and crystals of larger sizes are being announced at frequent intervals. Again, some of the liquid luminophors have proven to be even more efficient than the crystals and it is thought that for natural gamma ray logging a liquid luminophor in a container a few inches in length could be equivalent to a conventional counter 3 or 4 feet long. It is obvious that the definition obtainable with a scintillation detector a few inches long would be far superior to that now obtained with a detector say 40 inches in length.

It is believed that the construction and operation of a Scintillometer is well understood. Such an instrument comprises, of course, a luminophor, i.e., substance in which scintillations are produced when the substance is struck by penetrative radiation such as, for example, gamma rays and neutrons. Closely adjacent the luminophor is a photo multiplier tube or phototube having a cathode member exposed to the light or scintillation in the luminophor annd from which an electron is emitted when the cathode is struck by a photon. These electrons are amplified in number in the phototube and the output passes to a preamplifier and from there usually to another amplifier and a recorder. The luminophor may be in the form of a thallium activated sodium iodide crystal for example, and other solid or crystal luminophors may be used, which, like thalium activated sodium iodide, are translucent to their own luminescent photons. Terphenyl in xylene is an example of one of the liquid luminophors. If desired, the luminophor may be incorporated in a solid plastic and molded to a suitable shape as is disclosed in the U.S. Letters Patent granted to C. G. Ludeman, July 3, 1951, No. 2,559,219. Where NaI(Tl) crystals are suitable, it may be desirable to use two of the crystals in adjacent relation with two phototubes, one at the top and one at the bottom of the crystal unit. As will be described hereinafter, the phototubes may be connected in a coincidence circuit so as to minimize as far as possible the unwanted background which otherwise might prove excessive.

As an example of a suitable well-logging Scintillometer one could utilize two of the NaI(Tl) crystals disposed between two end-window phototubes of the 5819 type manufactured by the Radio Corporation of America, thus making an instrument having an overall length of about 80 cm. including the two preamplifiers and having a sensitive length of about 10 to 15 cm. Such a detector will have roughly the same counting rate per unit flux as a conventional counter tube 3 inches in diameter by 30 inches in length and of 5% efficiency.

In this example it will be seen that excellent definition can be obtained since the sensitive length of the Scintillometer is only about ⅙ that of the counter tube. It is desirable and, perhaps, essential in some instances that a well logging Scintillometer be cooled while in use and this is particularly true where deep wells are to be logged. The photo cathode of the type 5819 phototube or any of the other commercial photo-multipliers is limited to an ambient temperature of about 75° C. (167° F.) since temperatures exceeding this value would destroy the surface of the tube. Thus, without refrigeration, the instrument could probably not be used effectively to any greater depths in a bore hole than about 5,000 feet. It is desirable that substantially all of the phototube be cooled as well as the photo cathode area on the end of the tube. Another reason for cooling the phototube is to suppress the thermal noise counting rate. At elevated temperatures this background might be so high as to render the Scintillometer impractical for use in well logging. A still further reason for refrigerating the Scintillometer is the fact that many luminophors show a decreasing light output with increasing temperature. In the following description several ways are shown for cooling the Scintillometer as well as a coincidence circuit for minimizing background or spurious counts.

Referring to the drawing:

Figure 1 is a somewhat diagrammatic sectional elevation through a section of a bore hole in which a logging instrument embodying the principles of this invention is suspended;

Figure 2 is a vertical section through a Scintillometer showing one form of cooling means;

Figure 3 is a section similar to Figure 2 but showing another means for cooling the device;

Figure 4 is a similar view but showing means for cooling only the cathode of the phototube;

Figure 5 is a view similar to Figures 2 through 4 but in which two phototubes are used;

Figure 6 is a schematic diagram showing two phototubes connected in a coincidence circuit; and, Figure 6a shows oscilloscope traces of the output of the amplifiers shown in Figure 6.

With reference to the drawing and particularly to Figure 1 thereof, a bore hole 10 is shown as penetrating a plurality of sub-surface formations such as 12 and 14. Shown suspended in the hole is a logging instrument housing or electrode 16 attached to a suitable conductor cable 18 leading to the surface. At the surface the cable passes over a suitable cable measuring reel 20 which measures the amount of cable payed out and thus the depth of the instrument in the bore hole. Within the instrument housing 16 is a source 22 of radiation which may for purposes of illustration be considered as a mixture of radium and beryllium from which neutrons 24 pass outwardly to bombard the earth formations. Also within the logging instrument housing is a Scintillometer indicated generally by the reference character 26 and comprising a luminophor 28 which may be of the NaI(Tl) crystal type and a phototube 30 connected to a preamplifier 32. The output of the preamplifier is conducted upwardly over the cable 18 to an amplifier 34 at the surface, connected in turn to a recorder 36.

Between the source 22 and the Scintillometer 26 is a shield 38 for preventing neutrons and gamma rays from the source from passing directly to the detector. This shield may comprise a bottom layer of a hydrogenous material such as paraffin for slowing down the neutrons, an intermediate layer of a substance such as cadmium capable of absorbing the slow neutrons and an upper layer of a material such as lead capable of absorbing gamma rays. The luminophor 28 is also preferably surrounded by a cylindrical shield 40 of a substance such as cadmium capable of absorbing slow neutrons which may have been scattered in the formations and returned toward the detector, and an inner cylindrical shield 42 comprising a fairly thin layer of lead or the like capable of absorbing gamma rays which may be induced in the shield 40 due to neutron bombardment of the cadmium and also gamma rays which may originate in the source 22 to be scattered in the surrounding formations and returned toward the detector. With the shielding as shown the luminophor will respond to induced gamma rays such as the one indicated at 44 caused by bombardment of the formations by neutrons such as the one indicated at 24. Photons produced in the luminophor 28 cause electrons to be emitted from the cathode of the phototube 30 and the resulting pulses are preamplified at 32 and passed over the cable to the amplifier 34 from which they are recorded by the device 36.

A fairly simple means for cooling the Scintillometer is shown in Figure 1 and also in Figure 2. This means comprises a Dewar flask 46 containing a liquid coolant 48 of any suitable type. A suitable packing means 50 is shown as closing the annular space between the upper end of the Dewar flask and the base of the phototube 30.

In Figure 1 the luminophor 28 is shown as being in substantially the same position as would be the lower end of a vertically elongated conventional type detector such as a counter tube or an ionization chamber. As has been explained hereinbefore, due to the short vertical length of the luminophor 28 boundaries such as that indicated at 52 between adjacent formations will be much more sharply indicated in the log than would be the case if a conventional detector were used which is several times as long as the height of the luminophor.

In Figure 3 the luminophor 28 and the phototube 30 are shown as disposed within a suitable container 54 through which a coolant 48 is circulated from any suitable refrigeration device 56. As the coolant 48 any suitable substance can be used such as glycerine, alcohol, acetone, etc.

Figure 4 shows the coolant container 58 as being just large enough to cover the upper end of the luminophor 28 and the cathode of the phototube 30.

In Figure 5, two phototubes 30a and 30b are shown with the luminophor 28 disposed between them. A coolant container 58 covers the luminophor as well as the cathode ends of the phototubes.

It will be observed that the coolant 48 acts also as an "optical link" between the luminophor and the photo cathode and the photons from the luminophor can thus reach the photo cathodes with very little loss. It is also understood that the coolant shown in Figures 4 and 5 can be circuated through the coolant container by means of any suitable refrigeration unit such as is indicated at 56 in Figure 3.

In Figure 6 the luminophor is shown as disposed between and closely adjacent the cathodes of two phototubes as in Figure 5. The output of preamplifier No. 1 passes through the pulse amplifier No. 1 and then to a suitable coincidence circuit preferably including a discriminator and scaler circuit of any well-known type. The output of the preamplifier No. 2 also passes through the pulse amplifier No. 2 and then through the coincidence circuit. A suitable power and high voltage supply is shown as connected to the two preamplifiers. Figure 6a diagrammatically illustrates oscilloscope traces which might be obtained from the two pulse amplifiers Nos. 1 and 2 of Figure 6. A gamma ray in striking the luminophor will cause pulses to be produced in both preamplifiers, simultaneously and these pulses are indicated at 60. Since these pulses are produced simultaneously, they will be registered by the coincidence circuit and will be recorded on the log. On the contrary, the random pulses such as those indicated at 62 and which may be caused for example by thermal emission in the phototubes do not occur simultaneously and, therefore, they will not be passed simultaneously to the coincidence circuit. It can be seen, therefore, that with this circuit as shown in Figure 6 the background will be materially reduced and a sharper and more meaningful log will result.

It is understood that the described means for cooling the Scintillometer are by way of example only and it is contemplated that other means can be used for accomplishing the desired result. For instance, it may be desired to utilize a cooling system such as is shown in Figure 3 of my U.S. Letters Patent No. 2,433,554, granted December 30, 1947. In that patent a system is disclosed in which a material such as carbon dioxide gas passes through a cooling coil disposed around the circuit of an ionization chamber used in well-logging, the amount of gas passed through the coil being controlled by a thermostatically actuated valve.

Although Figure 1 of the drawing has been described with reference to induced gamma ray logging, it is to be understood that in scattered gamma ray logging, the arrangement will be very similar. In the latter case, however, the source 22 will comprise a source of gamma rays rather than neutrons and gamma rays and the bottom two shield layers of the absorber 38 will not be necessary. In this case the absorber 38 should be made of lead or the like capable of absorbing the gamma rays which might otherwise pass directly from the source to the Scintillometer. Likewise in scattered gamma ray logging the cylindrical shields 40 and 42 will not be needed since there will be no source of neutrons carried by the logging electrode.

Although an instrument for use in natural gamma ray logging has not been illustrated, it is believed that such illustration is not necessary since such an instrument would include essentially a Scintillometer and preamplifier such as are shown in Figure 1, but no radiation source of shielding would be needed.

While the invention has been described mainly with reference to well logging, it is to be understood that a device similar to any of the embodiments described can be moved along parallel to the surface of the earth and due to the high efficiency and small size of the Scintillometer, boundaries between different formations can be located with greater accuracy than where conventional larger detectors are used.

Obviously many modifications and variations of the invention as hereinbefore set forth, may be made without departing from the spirit and scope thereof and, therefore, only such limitations should be imposed as are indicated in the appended claims.

The embodiments of the invention in which an exclusive property or privilege is claimed are defined as follows:

1. The method of logging earth formations traversed by a bore hole which comprises passing through said hole a source of gamma rays to bombard said formations and cause gamma rays to be scattered thereby measuring the intensity of scattered gamma radiation entering the hole from the traversed formations, the measurement being made within a zone spaced from said source and having a vertical dimension not more than one sixth the distance between the source and said zone.

2. A device for logging a bore-hole traversing an earth formation comprising an elongated instrument housing adapted to be passed through the bore-hole while suspended on a conductor cable, a source of gamma rays disposed within said housing, a scintillation detector also disposed within the housing and spaced from said source, said scintillation detector having a sensitive surface whose vertical dimension is not more than one sixth the distance between said source and said surface, means between said source and said detector for absorbing radiation which might otherwise pass directly from the source to the detector.

References Cited in the file of this patent

UNITED STATES PATENTS 2,508,772     Pontecorvo _____ May 23, 1950